(12) United States Patent
Lee et al.

(10) Patent No.: US 8,861,320 B2
(45) Date of Patent: Oct. 14, 2014

(54) LENS DRIVING UNIT AND OPTICAL PICKUP INCLUDING THE SAME

(71) Applicants: Young-bin Lee, Suwon-si (KR); Seok-gyun Lee, Suwon-si (KR)

(72) Inventors: Young-bin Lee, Suwon-si (KR); Seok-gyun Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/675,027

(22) Filed: Nov. 13, 2012

(65) Prior Publication Data

US 2013/0229903 A1    Sep. 5, 2013

(30) Foreign Application Priority Data

Mar. 2, 2012 (KR) .................. 10-2012-0022034

(51) Int. Cl.
| | |
|---|---|
| G11B 7/09 | (2006.01) |
| G11B 7/00 | (2006.01) |
| G02B 7/02 | (2006.01) |
| G11B 7/1374 | (2012.01) |

(52) U.S. Cl.
CPC .............. *G11B 7/1374* (2013.01); *G02B 7/023* (2013.01); *G11B 7/0932* (2013.01); *G11B 7/0935* (2013.01)

USPC .................. 369/44.14; 369/44.15; 369/44.16; 720/681; 720/685; 720/683

(58) Field of Classification Search
CPC ..... G11B 7/0935; G11B 7/0932; G11B 7/093
USPC ........... 369/44.14–44.16, 44.32, 44.23, 44.37
See application file for complete search history.

(56) References Cited

U.S. PATENT DOCUMENTS

| 6,880,165 | B2 | 4/2005 | Sugawara | |
|---|---|---|---|---|
| 7,280,442 | B2 * | 10/2007 | Ju et al. ....................... | 369/44.16 |
| 7,305,688 | B2 * | 12/2007 | Yang et al. .................... | 720/683 |
| 2007/0067787 | A1 * | 3/2007 | Asai ............................... | 720/681 |
| 2008/0253241 | A1 * | 10/2008 | Komori et al. ............. | 369/44.32 |
| 2011/0122744 | A1 * | 5/2011 | Komma et al. ............ | 369/44.14 |

\* cited by examiner

*Primary Examiner* — Wayne Young
*Assistant Examiner* — Dionne Pendleton
(74) *Attorney, Agent, or Firm* — NSIP Law

(57) ABSTRACT

Provided is a lens driving unit for an optical pickup and an optical disc drive that employs the lens driving unit. The lens driving unit includes a lens frame in which an object lens and a plurality of driving coils are installed, and a plurality of suspension wires connected to the driving coils. The lens frame also includes a plurality of winding posts disposed on opposing sides of the lens frame and extending in a direction in which the suspension wires extend. According to various examples, coil ends of the driving coils are wound around the winding posts to electrically connect the driving coils to the suspension wires.

13 Claims, 6 Drawing Sheets

LENS DRIVING UNIT AND OPTICAL PICKUP INCLUDING THE SAME

CROSS-REFERENCE TO RELATED APPLICATION(S)

This application claims the benefit under 35 USC §119(a) of Korean Patent Application No. 10-2012-0022034, filed on Mar. 2, 2012, in the Korean Intellectual Property Office, the entire disclosure of which is incorporated herein by reference for all purposes.

BACKGROUND

1. Field

The following description relates to a lens driving unit and optical pickup of an optical disc drive, and more particularly, to an actuator of an optical disc drive that includes a suspension wire fixed structure.

2. Description of Related Art

An optical disc drive includes an optical pickup for reading information from a disc and for writing information to a disc. An object lens driving unit of the optical pickup is typically driven by a voice coil motor (VCM). The object lens driving unit may include a static structure including a permanent magnet and a yoke, and a moving structure including a driving coil and an object lens. In general, the moving structure is supported by a plurality of suspension wires, in comparison to the static structure. The suspension wires provide an electrical connection for applying a driving voltage to the driving coil to control focusing and tracking of a lens.

Slim-type optical disc drives are used for devices with limited thickness, such as notebook computers. Accordingly, an optical pickup for a slim-type optical disc drive should also have a limited thickness. However, the optical pickup has elements that have limits to how thin they may be structurally made. One of these elements is a structure connecting a suspension wire and a driving coil.

Conventionally, a structure of an optical pickup in which connecting portions are alternately formed has been suggested to prevent an increase in a thickness (height) of an actuator due to connecting portions between suspension wires and driving coils. However, this structure has a structural complexity. For example, positions of contact points corresponding to winding posts cross each other and suspension wires having different lengths are bonded to the contact points. Thus, there is a need for a simplified structure.

SUMMARY

In an aspect, there is provided a lens driving unit including a wire holder, a lens frame comprising an object lens and a plurality of driving coils, a plurality of suspension wires connected to the plurality of driving coils, wherein the suspension wires are fixed to the wire holder and are fixed to opposing side surfaces of the lens frame, and a plurality of winding posts disposed on the opposing sides of the lens frame and extending in a direction in which the suspension wires extend, wherein coil ends of the driving coils are wound around the winding posts and are electrically connected to the suspension wires through connecting portions included in the winding posts.

The lens driving unit may further comprise a terminal plate which includes the plurality of winding posts which are formed on the opposing sides of the lens, and through holes through which ends of the suspension wires penetrate.

The winding posts and the through holes may be arranged in a plane direction parallel to the opposing sides of the object lens.

The winding posts may comprise a triangular pillar shape, and the through holes may be located inside a quadrangular area expanded from an area of the winding posts which includes the triangular pillar shape.

The through holes may be formed in the middle of the winding posts, respectively.

Opening portions of the through holes may expand in one direction, and connection portions for electrically connecting ends of the suspension wires and the coil ends of the driving coils may be formed in the opening portions.

The driving coils may be formed at two side surfaces crossing at right angles to a direction in which the suspension wires extend.

The lens frame may correspond to a slim type optical disc drive.

In an aspect, there is provided an optical pickup including an object lens facing an optical recording medium, a lens driving unit configured to drive the object lens, a light source configured to emit light toward the object lens, and a light-receiving device configured to receive light reflected by the optical recording medium, wherein the lens driving unit comprises a wire holder, a lens frame comprising the object lens and a plurality of driving coils, a plurality of suspension wires connected to the plurality of driving coils, wherein the suspension wires are fixed to the wire older and are fixed to opposing side surfaces of the lens frame, and a plurality of winding posts disposed on the opposing sides of the lens frame and extending in a direction in which the suspension wires extend, wherein coil ends of the driving coils are wound around the winding posts and are electrically connected to the suspension wires through connecting portions included in the winding posts.

The lens driving unit may further comprise a terminal plate which includes the plurality of winding posts formed on opposing sides of the lens frame, and through holes through which ends of the suspension wires penetrate.

The winding posts and the through holes may be arranged in a plane direction parallel to the opposing sides of the object lens.

The winding posts may comprise a triangular pillar shape, and the through holes may be located inside a quadrangular area expanding from an area of the winding posts which includes the triangular pillar shape.

The through holes may be formed in the middle of the winding posts, respectively.

Opening portions of the through holes may expand in one direction, and connection portions for electrically connecting ends of the suspension wires and the coil ends of the driving coils may be formed in the opening portions.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
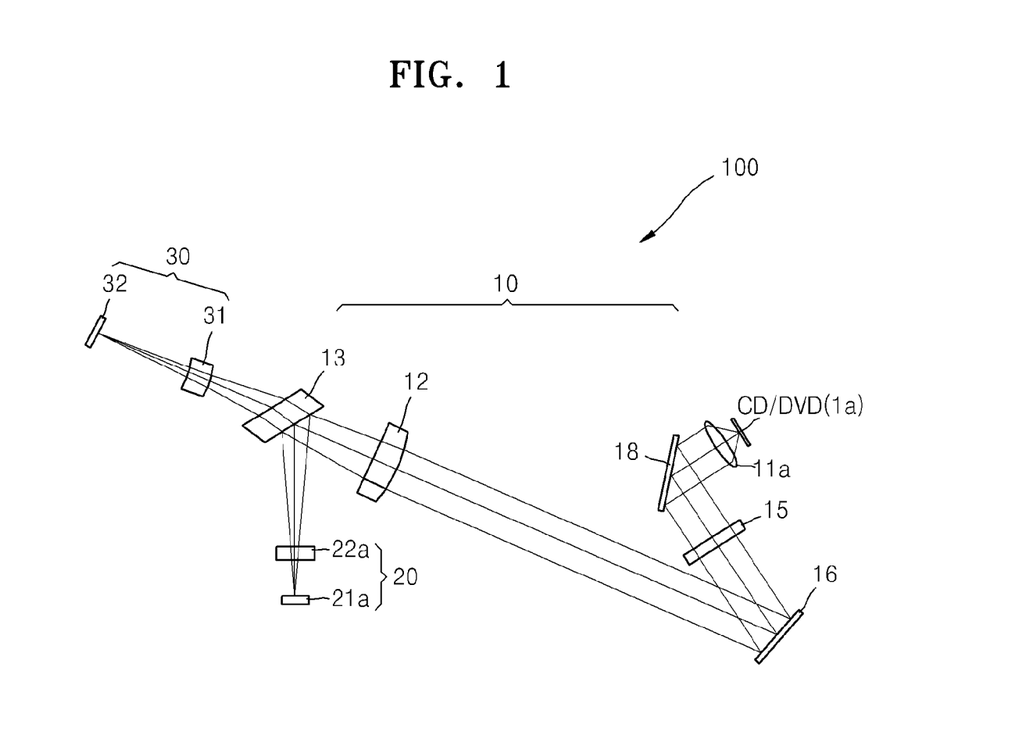
FIG. 1 is a diagram illustrating an example of an optical pickup.

FIG. 1 illustrates an example of an optical pickup 100 that is compatible with a CD/DVD. For example, the optical pickups described herein may be included in a slim-type optical disc drive that may be used in a terminal such as a laptop computer, a notebook computer, a tablet, a mobile phone, and the like.

Referring to FIG. 1, the optical pickup 100 includes an optical transmission system 10, a light source system 20, and a light-receiving system 30. The optical transmission system 10 may be used to transmit/receive data to and/from a medium 1a. In this example, the medium 1a may be a compact disc (CD), a digital video disc (DVD), and the like.

The light source system 20 may provide a plurality of beams, for example, a main beam positioned in the center of three beams and first and second sub-beams at two sides of the main beam, to reproduce/record information from/to the medium 1a. The light-receiving system 30 may generate an electrical signal, such as a data signal or a tracking error signal (TES), using a light-receiving device 32 that has three light-receiving cells for receiving three beams reflected by the medium 1a. The light-receiving system 30 may generate the electrical signals to reproduce information and a TES (Tracking Error Signal).

In this example, the light source system 20 includes a light source 21a for a CD and/or a DVD and a diffraction device 22a. A beam from the light source 21a is incident on a first beam splitter 13 via the diffraction device 22a. The diffraction device 22a may generate the main beam and the first and second sub-beams by diffracting a single beam from the light source 21a.

The light-receiving system 30 includes the light-receiving device 32 for generating an electrical signal by detecting the three beams reflected by the medium 1a and which pass through the first beam splitter 13. The light-receiving system 30 also includes a sensing lens 31 for focusing the main beam and the first and second sub-beams to an appropriate size with respect to the light-receiving device 32.

The optical transmission system 10 includes an object lens 11a corresponding to the medium 1a, path change mirrors 16 and 18, a quarter wave plate (QWP) 15, a collimating lens 12, and the first beam splitter 13. The first beam splitter 13 may reflect the three beams from the light source system 20 toward the object lens 11a and transmit light reflected by the medium 1a so as to be incident on the light-receiving system 30.

Figure 2:
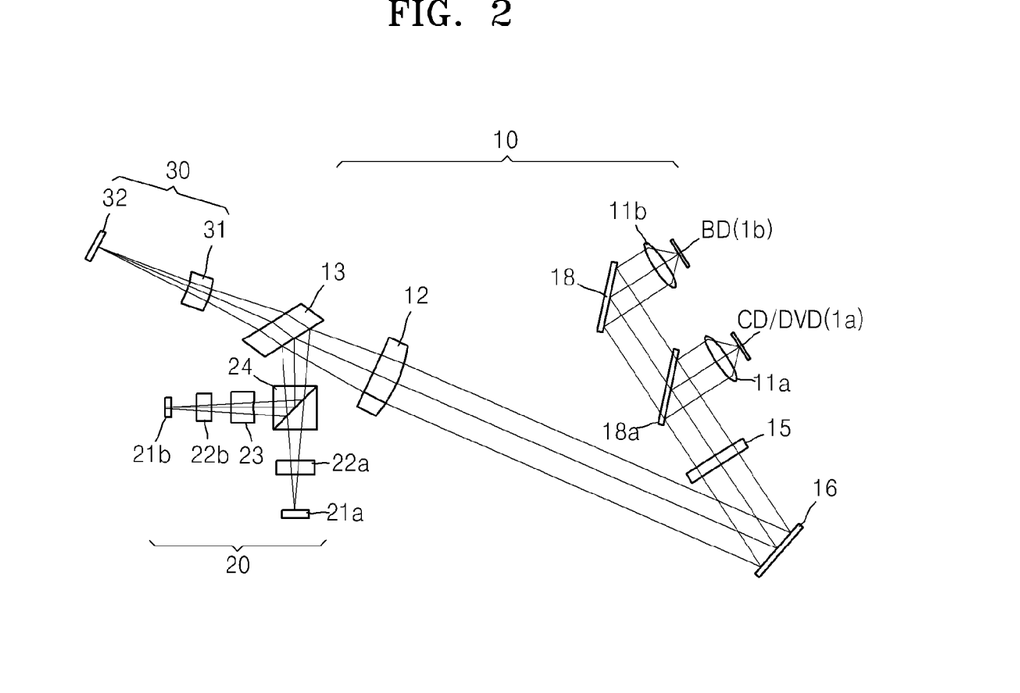
FIG. 2 is a diagram illustrating another example of an optical pickup.

FIG. 2 illustrates another example of an optical pickup that is compatible with a CD/DVD and which is also compatible with a Blu-ray disc (BD). Throughout the examples herein, unless expressly stated otherwise, it should be appreciated that both the optical pickup in FIG. 1 and FIG. 2 may be used.

Referring to FIG. 2, the optical transmission system 10 further includes a dichroic mirror 18a and an additional object lens 11b. In this example, the dichroic mirror 18a may reflect light from a CD/DVD medium 1a and may allow blue light from a Blu-ray medium 1b to pass through.

In this example, the total reflection mirror 18 and the dichroism mirror 18a are selective elements which are disposed on a path in which light from the optical path changing mirror 16 travels. Light from the first beam splitter 13 is reflected toward the dichroism mirror 18a, and light reflected from the mediums 1a and 1b is reflected toward the first beam splitter 13.

In this example, the light source system 20 includes a plurality of light sources 21a and 21b respectively corresponding to the mediums 1a and 1b, for example, light source 21a for a CD/DVD and light source 21b for a BD. The light sources 21a and 21b may emit light toward two incident surfaces of a second beam splitter 24 that has a cubic structure. A coupling lens 23 may be used to adjust an optical distance between the light source 21b for a BD and the mediums 1a and 1b by adjusting an optical magnification, i.e., an amount of defocused traveling light, is disposed between the light source 21b for a BD and the second beam splitter 24.

Light from the two light sources 21a and 21b may be directed to the first beam splitter 13 via the second beam splitter 24. A diffraction device 22a for a CD/DVD is disposed between the second beam splitter 24 and the light source 21a, and a diffraction device 22b for a BD for forming the main beam and the first and second sub-beams is disposed between the second beam splitter 24 and the light source 21b. Intervals between the main beam and first and second sub-beams vary according to an interval between grids of a diffraction device.

Figure 3:
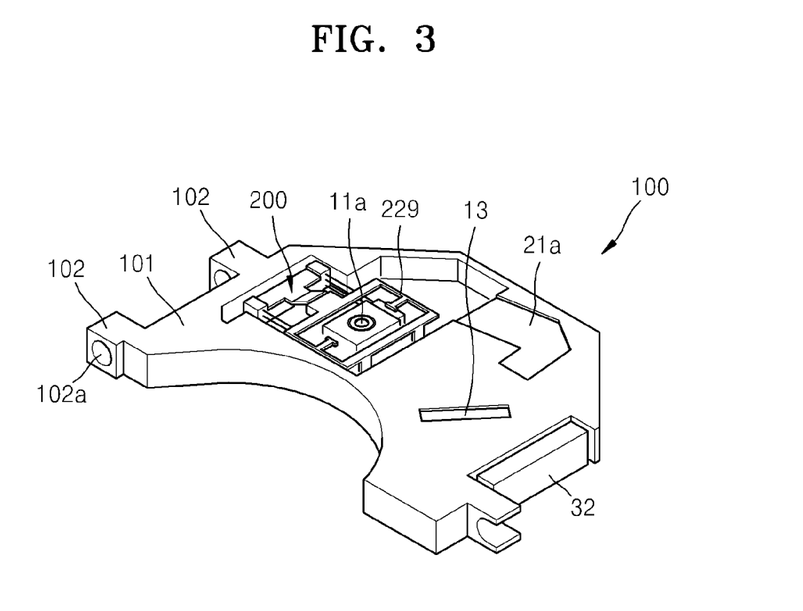
FIG. 3 is another diagram illustrating an example of the optical pickup of FIG.

FIG. 3 illustrates another example of the optical pickup 100 for a CD/DVD shown in FIG. 1.

Referring to FIG. 3, the optical pickup 100 includes a body 101 that may have a predetermined thickness. As an example, the body 101 may be formed by aluminum die casting or plastic molding. The optical pickup 100 also includes an object lens driving unit 200 which includes a protecting cover 229 for covering the object lens 11a and for partially covering a peripheral portion of the object lens 11a. The object lens driving unit 200 is formed in the body 101. According to the configuration shown in FIG. 1, the first beam splitter 13, the light source 21a, and the light-receiving device 32 are inserted and fixed to the body 101. A shaft guiding portion 102 including a through-hole 102a into which a guide shaft (not shown) of an optical disc drive is inserted is formed at one side of the body 101.

Figure 4:
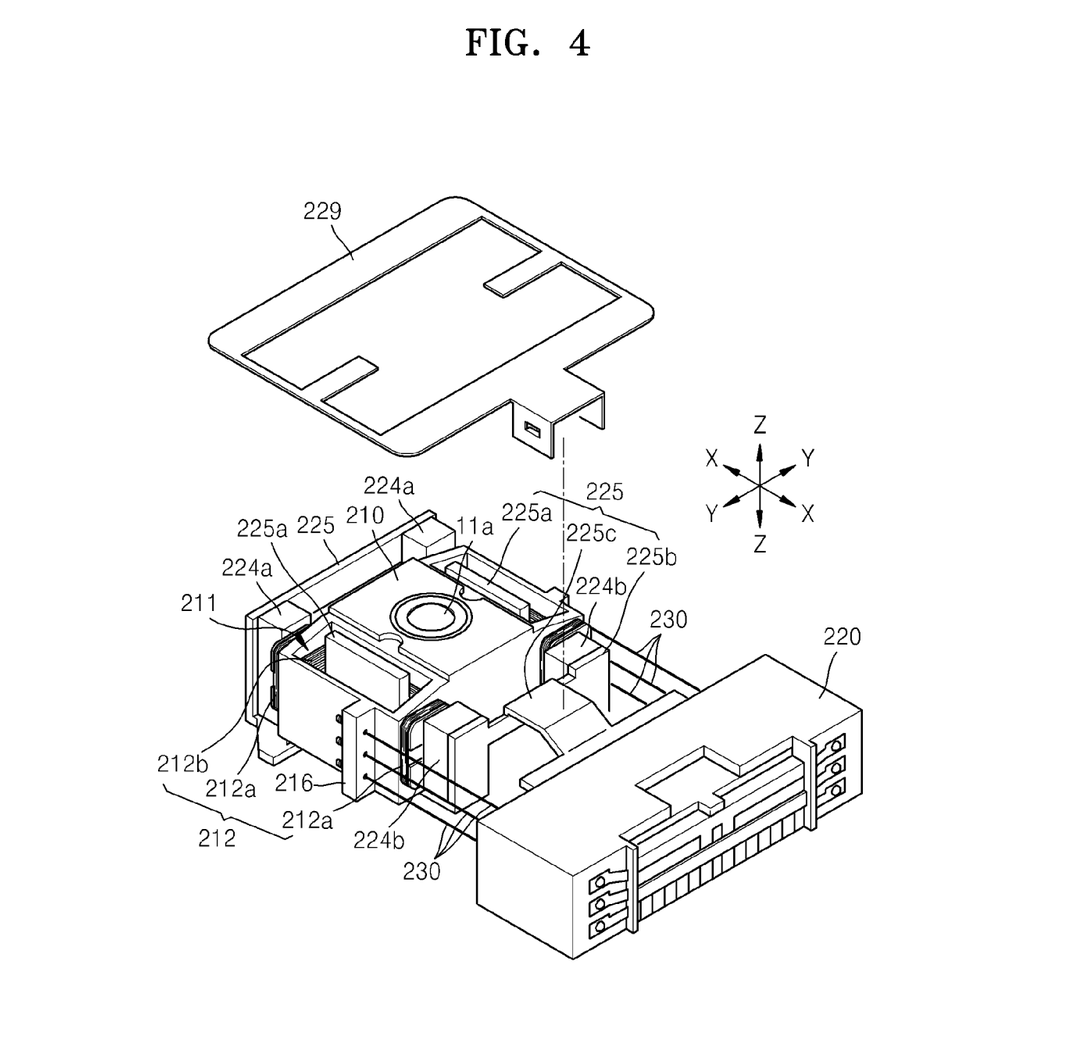
FIG. 4 is a diagram illustrating an example of an object lens driving unit.
Figure 5:
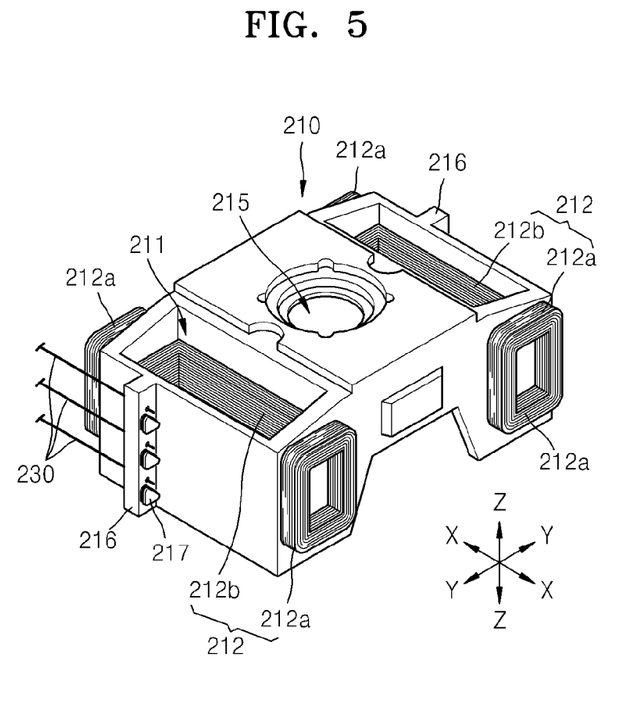
FIG. 5 is a diagram illustrating an example of a lens frame supporting an object lens in the object lens driving unit.
Figure 6:
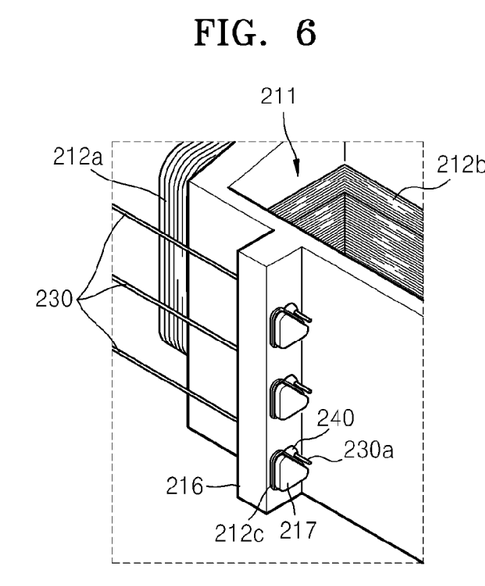
FIG. 6 is a diagram illustrating an example of a terminal plate included in the lens frame.

FIG. 4 illustrates an example of the object lens driving unit 200. FIG. 5 illustrates an example of a lens frame 210 supporting the object lens 11a in the object lens driving unit 200. FIG. 6 illustrates an example of a front view of a terminal plate 216 of the lens frame 210.

As shown in FIG. 4, the object lens 11a is disposed at the center of a top surface of the lens frame 210, and a peripheral portion of the object lens 11a is covered by the protecting cover 229. A tetragonal through-hole 211 in which a center yoke 225a is disposed is formed at two sides of the lens frame 210 in a major axis (Y-Y) direction. In this example, the lens frame 210 is connected to a wire holder 220 via a plurality of suspension wires 230 that are fixed at two sides in the major axis (Y-Y) direction. A driving coil structure 212 is fixed to the lens frame 210. In this example, the driving coil structure 212 is electrically connected to the suspension wires 230.

The driving coil structure 212 includes first and second driving coils 212a and 212b that are fixed to first and third side surfaces of the lens frame 210 in a minor axis (X-X) direction. The suspension wires 230 are electrically connected to the first and second driving coils 212a and 212b. A yoke structure 225 includes the center yoke 225a, an outer yoke 225b, and a connecting unit 225c. The connecting unit 225c of the yoke structure 225 is fixed to the wire holder 220.

The object lens driving unit 200 may be classified as an object lens driving unit that has a moving structure and that has a static structure. The moving structure includes the object lens 11a corresponding to a recording medium, the lens frame 210 supporting the object lens 11a, and the driving coil structure 212 for focusing and tracking operations of the object lens 11a. The driving coil structure 212, as shown in the examples of FIGS. 4 and 5, includes two pairs of first driving coils 212a fixed to the first and third side surfaces of the lens frame 210 in the minor axis (X-X) direction, and two pairs of second driving coils 212b disposed inside the tetragonal through-hole 211.

The static structure includes a plurality of permanent magnets 224a and 224b corresponding to the first and second driving coils 212a and 212b, the yoke structure 225, and the wire holder 220 supporting the yoke structure 225. The magnets 224a and 224b are fixed to an inner surface of the outer yoke 225b and face the second driving coils 212b.

In this example, the two pairs of first driving coils 212a disposed on the first and third side surfaces of the lens frame 210 are tracking coils, and the two pairs of second driving coils 212b disposed inside the tetragonal through-hole 211 are focusing coils. Thus, the magnets 224a and 224b that are facing the first driving coils 212a and the second driving coils 212b and the center yoke 225a form a tracking control magnetic field and a focusing control magnetic field.

For example, the first and second driving coils 212a and 212b may be independent elements which are adhered to the first and third side surfaces of the lens frame 210 and the tetragonal through-hole 211. As another example, a bobbin (not shown) in which the first driving coils 212a are wound may be integrally disposed in the lens frame 210.

FIG. 6 is a partial enlarged view of a terminal plate 216 disposed at a side of the lens frame 210 in which a plurality of suspension wires 230 are fixed. Referring to FIGS. 5 and 6, the terminal plate 216 is formed at each of two sides of the lens frame 210. The terminal plate 216 extends in a vertical direction (Z-Z) crossing at right angles to a plane formed by the minor axis (X-X) and the major axis (Y-Y). In this regard, the major axis (Y-Y) direction is a direction in which tracking is performed in a radial direction of an optical disc drive, and the vertical (Z-Z) direction is a direction in which focusing is performed by the object lens 11a.

A plurality of winding posts 217 are disposed in the terminal plate 216 extending in the vertical direction (Z-Z) in which focusing is performed. The winding posts 217 extend in a direction in which the suspension wires 230 extend, that is, the minor axis (X-X) direction. A plurality of through holes 216a (shown in FIG. 8) through which a plurality of end portions 230a of the suspension wires 230 penetrate are formed in the terminal plate 216. In this example, the suspension wires 230 and the winding posts 217 may be disposed parallel to each other or may be inclined in the same direction.

Figure 7:
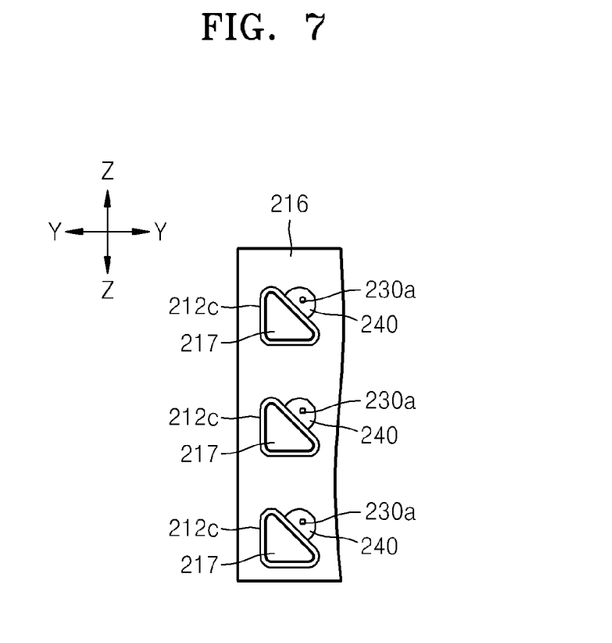
FIG. 7 is a diagram illustrating an example of suspension wires which are fixed in the lens frame of FIG. 6.
Figure 8:
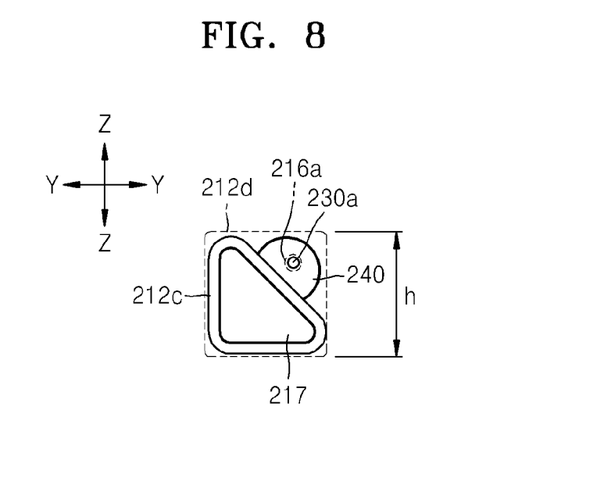
FIG. 8 is a diagram illustrating an example of a winding post to which a suspension wire is bonded in the lens frame of FIG. 6.

As shown in FIGS. 6-8, a plurality of coil ends 212c extending from the first and second driving coils 212a and 212b are wound around the winding posts 217. The end portions 230a of the suspension wires 230 may be electrically connected to the coil ends 212c wound around the winding posts 217 by a plurality of connecting portions 240 through a bonding process using lead or using a soldering material. In this example, the connecting portions 240 provide a means for electrically connecting the winding posts 217 and the coil ends 212c. Lead (Pb) is an example of a material that may be used to electrically connect the winding posts 217 and the coil ends 212c. However, the description herein is not limited thereto, and any of various other materials may be used. Also, the connecting portions 240 may be bonding portions that are formed through a direct bonding process instead of using a separate material, for example, a spot welding process. Accordingly, the connecting portions 240 may be formed by using any method used to electrically connect the winding posts 217 and the coil ends 212c.

According to various aspects, a connection space occupied by the end portion 230a and the connecting portion 240 is within the range of the winding post 217 in the focusing direction (Z-Z). Accordingly, the connection space does not expand or extrude over the range of the winding posts 217 in the focusing direction (Z-Z). That is, the end portions 230a of the suspension wires 230 and the connecting portions 240 connecting the end portions 230a to the coil ends 212c occupy the connection space within the range of the winding posts. Therefore, the connection space does not cause a change of the interval between the winding posts 217.

In this example, the suspension wires 230 are disposed close to the winding posts 217 in the focusing direction (Z-Z). Accordingly, intervals between the winding posts 217 in the focusing direction (Z-Z) or the vertical direction (Z-Z) are not limited by the connecting portions 240 for fixing the suspension wires 230 as in a conventional technology. Accordingly, there is no need to dispose the winding posts 217 in different locations. According to various aspects, the winding posts 217 in which the end portions 230a are wound are disposed close to the end portions 230a of the suspension wires 230, and the winding posts 217 extend in a direction in which the suspension wires 230 extend. Accordingly, the end portions 230a of the suspension wires 230 may be bonded to the connecting portions 240.

Referring to FIG. 8, the suspension wires 230 and the winding posts 217 are arranged in the major axis (Y-Y) direction, that is, a plane direction parallel to a side of the object lens 11a or in an arbitrary plane direction crossing at right angles to an optical axis of the object lens 11a. The suspension wires 230 are located inside an area of the winding posts 217 having a width (or height) h in the vertical direction (Z-Z).

According to various aspects, the end portions 230a of the suspension wires 230 and the connecting portions 240 do not affect the intervals between the winding posts 217. For example, the winding posts 217 have a triangular pillar shape in which a corner portion is formed at one side of a quadrangular area 212d shown as a dotted line and the end portions 230a of the suspension wires 230 are formed at another side of the quadrangular area 212d. In other words, the through holes 216a are located inside the quadrangular area 212d expanded from an area in which the winding posts 217 having a triangular pillar shape are formed.

Figure 9:
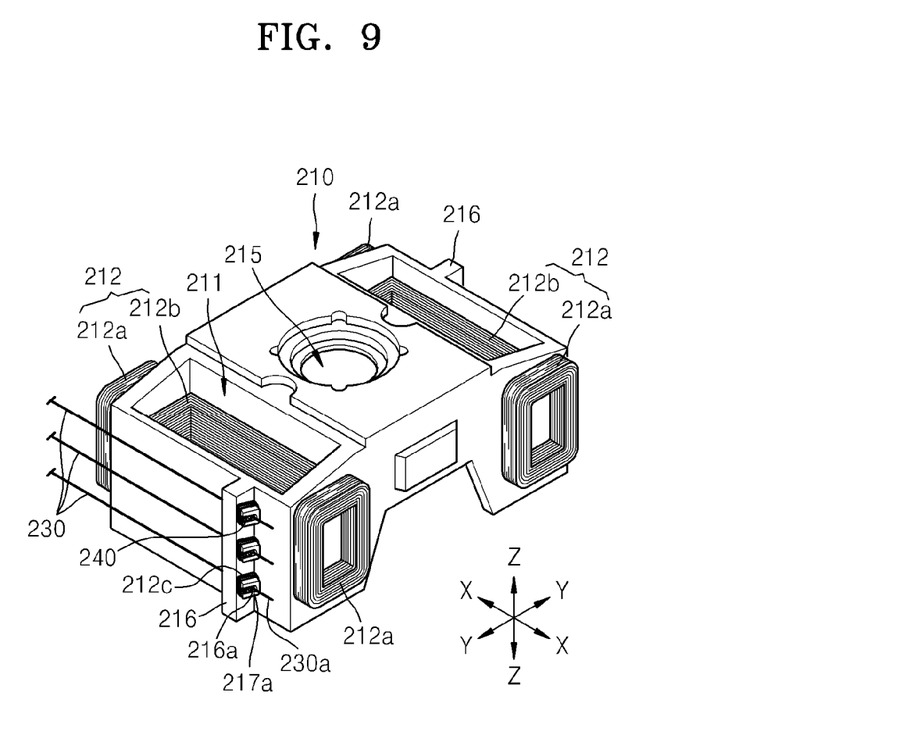
FIG. 9 is a diagram illustrating another example of a lens driving unit.
Figure 10:
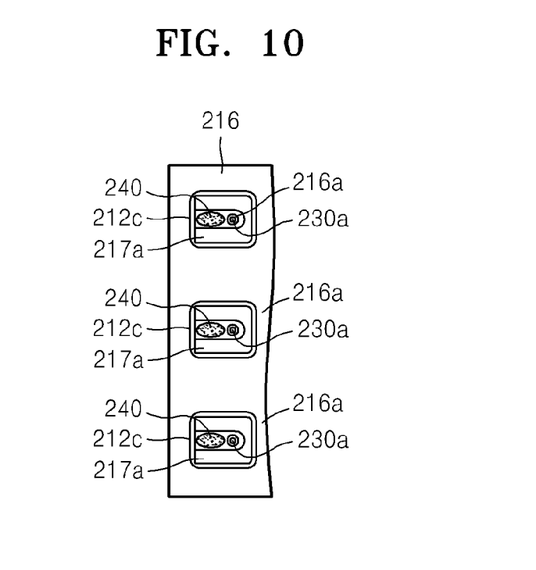
FIG. 10 is a diagram illustrating an example of a terminal plate shown in FIG. 9.

FIG. 9 illustrates another example of the lens frame 210 supporting the object lens 11a. FIG. 10 illustrates an example of the terminal plate 216 of FIG. 9 in which the end portions 230a of the suspension wires 230 formed at one side of the lens frame 210 are fixed.

Referring to FIG. 9, three winding posts 217a arranged in the vertical direction (Z-Z) are formed in the terminal plate 216, and coil ends 212c are wound around the winding posts 217a. The through holes 216a through which the end portions 230a of the suspension wires 230 penetrate is formed in the middle of the winding posts 217a. An opening portion of the through holes 216a expands in a horizontal direction, and a lower portion of the through holes 216a has a circular shape through which the end portions 230a of the suspension wires 230 may penetrate. The expanded opening portion of through hole 216a may be formed of a bonding material for bonding the coil ends 212c and the end portions 230a of the suspension wires 230 to be filled therein.

As shown in FIG. 10, the end portions 230a of the suspension wires 230 are disposed in the middle of the winding posts 217a, and the connecting portions 240 are formed in an upper end portion of the winding posts 217a. Accordingly, the end portions 230a of the suspension wires 230 and the connecting portions 240 do not affect the intervals between adjacent winding posts 217a.

In other words, in the examples of FIGS. 9 and 10, a charging space does not expand in the focusing direction (Y-Y) due to the end portions 230a of the suspension wires 230 and the connecting portions 240 connecting the end portions 230a to the coil ends 212c. In this example, the end portions 230a of the suspension wires 230 disposed in the middle of the winding posts 217 are within range of the winding posts 217 in the focusing direction (Y-Y). Accordingly, intervals between the winding posts 217 in the focusing direction (Y-Y) or the vertical direction (Z-Z) are not limited by the connecting portions 240 for fixing the suspension wires 230 as in a conventional technology. Thus, there is no need to dispose the winding posts 217 in different locations. According to various aspects, the end portions 230a of the suspension wires 230 are disposed in the middle of the winding posts 217 in which the end portions 230a are wound to bond the end portions 230a and the suspension wires 230 via the connecting portions 240.

In an actuator for an optical disc drive, coils are adhered to a lens frame, and winding posts are connected to the coils. Conventionally, a connection portion in which a coil end is bonded or wound limits intervals between the winding posts, and thus, there is a limit in reducing a thickness of a lens frame. However in order to solve the above-described problem of a conventional technology, winding posts and suspension wires are disposed in a direction that is not related to a thickness of a lens frame. Accordingly, a connection portion is formed in a plane direction instead of a heightwise direction of a lens frame, and thus an increase in the thickness of a lens frame is not required.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lens driving unit comprising:
   a wire holder;
   a lens frame comprising an object lens and a plurality of driving coils;
   a plurality of suspension wires connected to the plurality of driving coils, wherein the suspension wires are fixed to the wire holder and are fixed to opposing side surfaces of the lens frame; and
   a plurality of winding posts disposed on the opposing sides of the lens frame and extending in a direction in which the suspension wires extend, each winding post having a through hole through which an end of one of the suspension wires penetrates,
   wherein coil ends of the driving coils are wound around the winding posts and are electrically connected to the suspension wires through connecting portions included in the winding posts.

2. The lens driving unit of claim 1, further comprising a terminal plate which includes the plurality of winding posts which are formed on the opposing sides of the lens.

3. The lens driving unit of claim 2, wherein the winding posts and the through holes are arranged in a plane direction parallel to the opposing sides of the object lens.

4. The lens driving unit of claim 2, wherein the through holes are formed in the middle of the winding posts, respectively.

5. The lens driving unit of claim 4, wherein opening portions of the through holes expand in one direction, and connection portions for electrically connecting ends of the suspension wires and the coil ends of the driving coils are formed in the opening portions.

6. The lens driving unit of claim 1, wherein the driving coils are formed at two side surfaces crossing at right angles to a direction in which the suspension wires extend.

7. The lens driving unit of claim 1, wherein the lens frame corresponds to a slim type optical disc drive.

8. An optical pickup comprising:
   an object lens facing an optical recording medium;
   a lens driving unit configured to drive the object lens;
   a light source configured to emit light toward the object lens; and
   a light-receiving device configured to receive light reflected by the optical recording medium,
   wherein the lens driving unit comprises:
   a wire holder;
   a lens frame comprising the object lens and a plurality of driving coils;
   a plurality of suspension wires connected to the plurality of driving coils, wherein the suspension wires are fixed to the wire older and are fixed to opposing side surfaces of the lens frame; and
   a plurality of winding posts disposed on the opposing sides of the lens frame and extending in a direction in which the suspension wires extend, each winding post having a through hole through which an end of one of the suspension wires penetrates,
   wherein coil ends of the driving coils are wound around the winding posts and are electrically connected to the suspension wires through connecting portions included in the winding posts.

9. The optical pickup of claim 8, wherein the lens driving unit further comprises a terminal plate which includes the plurality of winding posts formed on opposing sides of the lens frame.

10. The optical pickup of claim 9, wherein the winding posts and the through holes are arranged in a plane direction parallel to the opposing sides of the object lens.

11. The optical pickup of claim 8, wherein the through holes are formed in the middle of each of the winding posts, respectively.

12. The optical pickup of claim 11, wherein opening portions of the through holes expand in one direction, and connection portions for electrically connecting ends of the suspension wires and the coil ends of the driving coils are formed in the opening portions.

13. The optical pickup of claim 12, wherein the lens frame corresponds to a slim type optical disc drive.

* * * * *